US012569088B2

(12) United States Patent
    Tapaninaho

(10) Patent No.: US 12,569,088 B2
(45) Date of Patent: Mar. 10, 2026

(54) COOKING APPARATUS

(71) Applicant: OONI LIMITED, West Lothian (GB)

(72) Inventor: Matti Kristian Tapaninaho, West Lothian (GB)

(73) Assignee: OONI LIMITED, Broxburn (GB)

( * ) Notice: Subject to any disclaimer, the term of this patent is extended or adjusted under 35 U.S.C. 154(b) by 316 days.

(21) Appl. No.: 17/105,248

(22) Filed: Nov. 25, 2020

(65) Prior Publication Data

US 2021/0076874 A1     Mar. 18, 2021

Related U.S. Application Data

(62) Division of application No. 15/832,765, filed on Dec. 5, 2017, now Pat. No. 11,399,658.

(30) Foreign Application Priority Data

Jan. 27, 2017     (GB) ...................................... 1701399

(51) Int. Cl.
    *A47J 37/07*      (2006.01)
    *A47J 37/01*      (2006.01)
    *A47J 37/06*      (2006.01)
    *F24B 1/24*       (2006.01)
    *F24B 1/26*       (2006.01)
    (Continued)

(52) U.S. Cl.
    CPC ........... *A47J 37/0704* (2013.01); *A47J 37/01* (2013.01); *A47J 37/0623* (2013.01); *A47J 37/0658* (2013.01); *A47J 37/0763* (2013.01); *F24B 1/24* (2013.01); *F24B 1/26* (2013.01); *F24B 5/087* (2013.01); *F24C 3/128* (2013.01); *F24C 15/002* (2013.01); *F24C 15/32* (2013.01);
    (Continued)

(58) Field of Classification Search
    USPC ....................................................... 126/25 R
    See application file for complete search history.

(56) References Cited

U.S. PATENT DOCUMENTS 2,582,331 A * 1/1952 Hoeffken .................. F23C 5/02
                                                  312/236
2,666,426 A * 1/1954 Pollard ............... A47J 37/0704
                                                  D7/334
                    (Continued)

FOREIGN PATENT DOCUMENTS

AU            624781 B3      4/1992
CN         101990916        3/2011
                    (Continued)

OTHER PUBLICATIONS

Uuni 2 Pizza Oven Review _ Trusted Reviews_2015_prior art, Caramel Quin. (Year: 2015).*
                    (Continued)

*Primary Examiner* — Steven B McAllister
*Assistant Examiner* — John E Bargero
(74) *Attorney, Agent, or Firm* — Nixon & Vanderhye P.C.

(57)     ABSTRACT

Cooking apparatus comprises an oven. The oven comprises a cooking chamber, a heated air source and two or more vents through which, in use, heated air can vent from the cooking chamber. The two or more vents comprise at least one lower vent and at least one upper vent. The at least one lower vent is provided at a lower height than the at least one upper vent. The at least one upper vent is controllable to regulate a flow of heated air therethrough.

19 Claims, 8 Drawing Sheets

(51) Int. Cl.

| | | |
|---|---|---|
| *F24B 5/08* | (2006.01) | |
| *F24C 3/12* | (2006.01) | |
| *F24C 15/00* | (2006.01) | |
| *F24C 15/32* | (2006.01) | |
| *F24B 1/20* | (2006.01) | |
| *F24C 7/06* | (2006.01) | |
| *F24C 15/02* | (2006.01) | |

(52) U.S. Cl.

CPC ................. *F24B 1/20* (2013.01); *F24C 7/067* (2013.01); *F24C 15/024* (2013.01)

(56) References Cited

U.S. PATENT DOCUMENTS

| | | | |
|---|---|---|---|
| 3,477,360 A | 11/1969 | Raney | |
| 4,375,213 A | 3/1983 | Kemp | |
| 4,800,865 A * | 1/1989 | Setzer ................. | A47J 37/0704 |
| | | | 99/481 |
| 5,203,316 A | 4/1993 | Pritchett | |
| 5,752,497 A | 5/1998 | Combs | |
| 6,000,389 A | 12/1999 | Alpert | |
| 6,293,271 B1 | 9/2001 | Barbour | |
| 8,387,610 B1 * | 3/2013 | Candelaria, Jr. .... | A47J 37/0786 |
| | | | 126/30 |
| D845,695 S * | 4/2019 | Wu ................................ | D7/334 |
| 11,684,212 B2 | 6/2023 | Dahle et al. | |
| 2004/0139958 A1 | 7/2004 | Werz | |
| 2009/0199839 A1 | 8/2009 | Hulsey | |
| 2013/0239945 A1 | 9/2013 | Han | |
| 2013/0276643 A1 * | 10/2013 | Krolick ................... | F24B 1/003 |
| | | | 99/447 |
| 2014/0026881 A1 * | 1/2014 | Abrams .............. | A47J 37/0658 |
| | | | 126/25 R |
| 2014/0326233 A1 * | 11/2014 | Traeger ............... | A47J 37/0704 |
| | | | 126/10 |
| 2015/0122241 A1 * | 5/2015 | Grant ...................... | F24B 1/026 |
| 2015/0164278 A1 | 6/2015 | Kohler | |
| 2016/0334106 A1 | 11/2016 | Reinhart | |
| 2016/0374509 A1 | 12/2016 | Blomberg | |
| 2017/0014000 A1 | 1/2017 | Minnich | |
| 2017/0020335 A1 | 1/2017 | Chen | |
| 2018/0142895 A1 | 5/2018 | Widmer | |

FOREIGN PATENT DOCUMENTS

| | | | |
|---|---|---|---|
| CN | 202154561 | | 3/2012 |
| EP | 0345784 | A1 | 12/1989 |
| EP | 0 981 990 | | 3/2000 |
| EP | 2845528 | A2 | 3/2015 |
| ES | 1 072 178 | | 6/2010 |
| FR | 2748384 | A1 | 11/1997 |
| FR | 2991158 | A1 | 12/2013 |
| GB | 954118 | | 4/1964 |
| KR | 20120054356 | A | 5/2012 |
| WO | 2016153547 | A1 | 9/2016 |

OTHER PUBLICATIONS https://www.youtube.com/watch?v=BiPXodAC7ho (Year: 2015).*
https://www.youtube.com/watch?v=P6xf08-vy6E (Year: 2015).*
Office Action (Non-Final Rejection) dated Sep. 28, 2021 for U.S. Appl. No. 15/832,765 (pp. 1-9).
Combined Search and Examination Report of Application No. GB2116179.9.
Combined Search and Examination Report under Sections 17 & 18(3) dated May 13, 2022 issued for GB2205168.4 (5 pages).
Examination Report under Section 18(3) dated Jul. 22, 2022 issued for GB Application No. GB2205168.4 (4 pages).
Office Action dated Jan. 19, 2023, issued for U.S. Appl. No. 17/842,916 (10 pages).
Patents Act 1977: Search Report under Section 17(5) for Application No. GB1701399.6; Dated May 16, 2017.
PCT International Search Report for Application No. PCT/GB2018/050236; Dated Mar. 26, 2018.
Office Action dated Apr. 14, 2021 for U.S. Appl. No. 15/832,765 (pp. 1-9).

\* cited by examiner

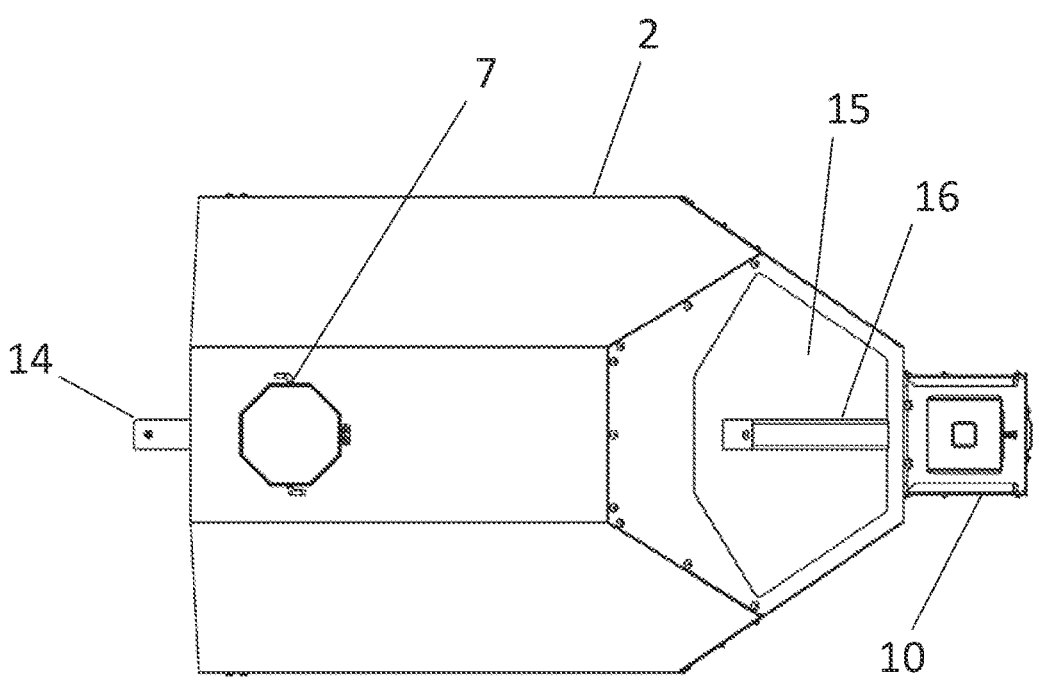
Fig. 3
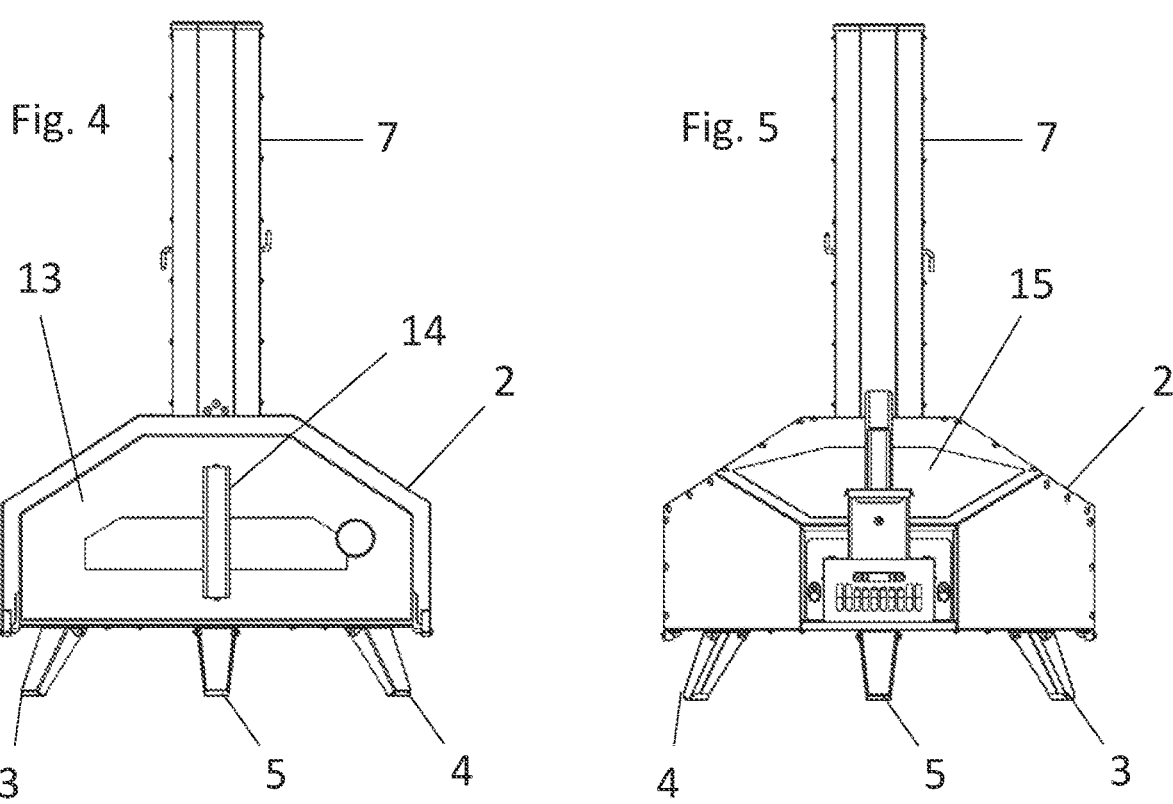
Fig. 4
Fig. 5

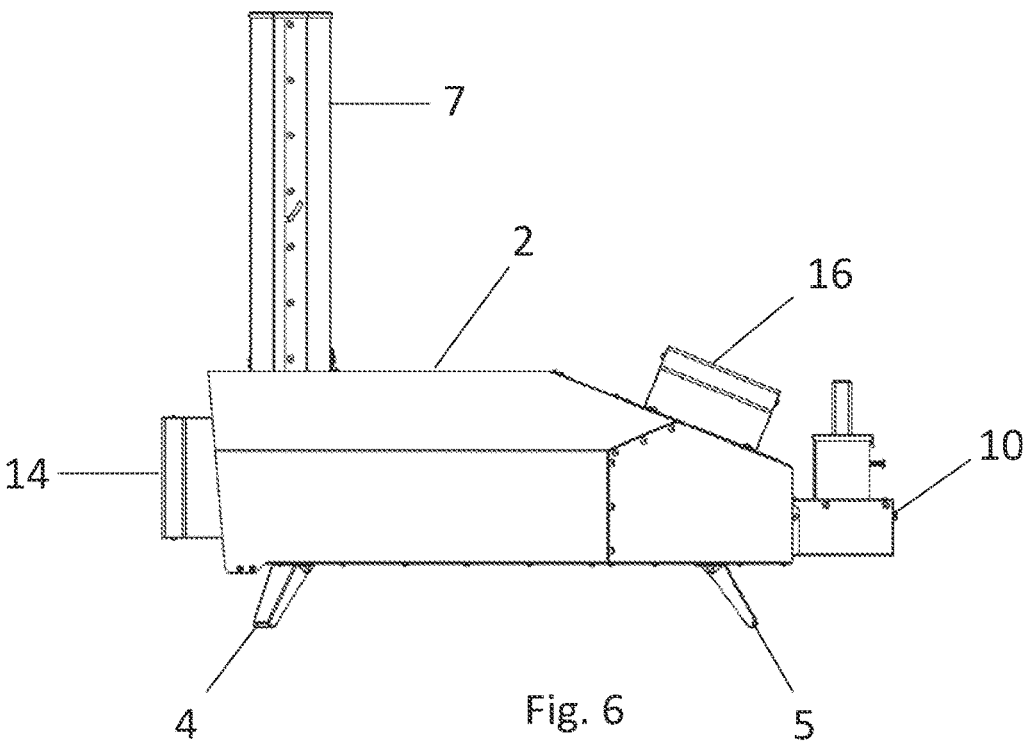
Fig. 6
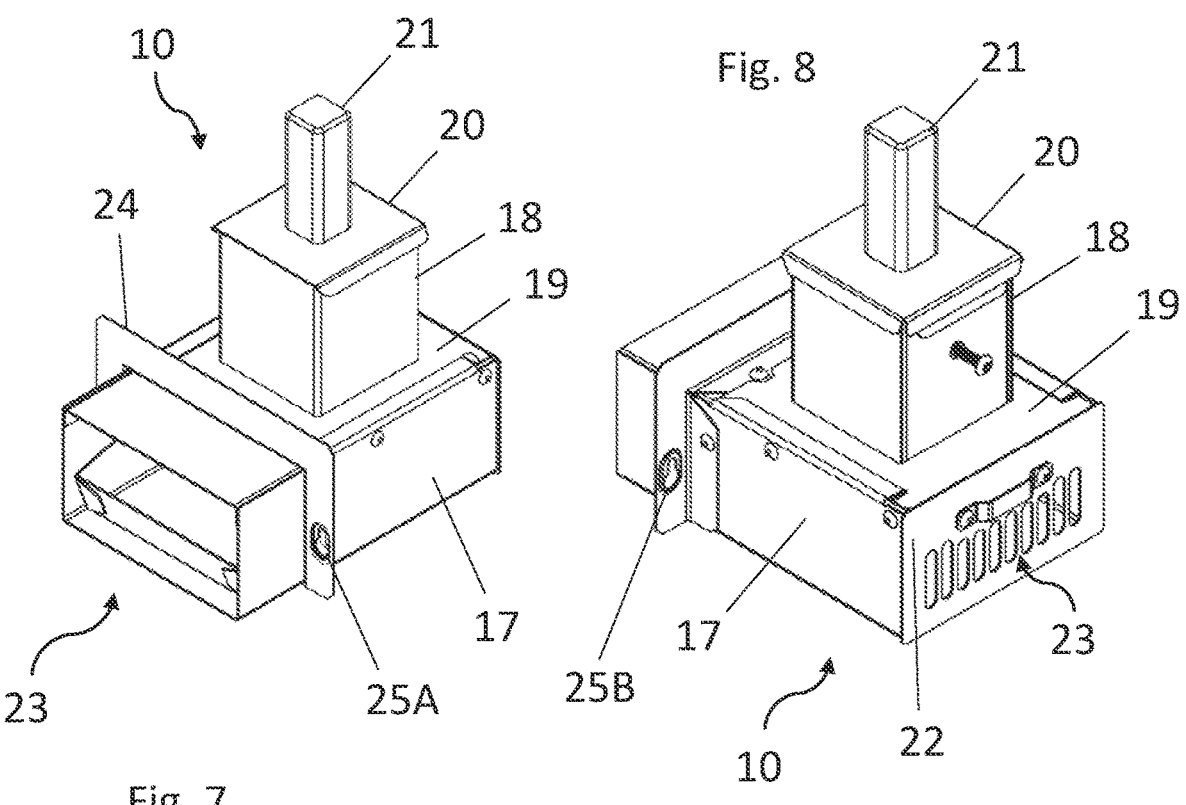
Fig. 8
Fig. 7

COOKING APPARATUS

RELATED APPLICATIONS

This application is a divisional of U.S. patent application Ser. No. 15/832,765, filed on Dec. 5, 2017, which claims the benefit of Great Britain (GB) Pat. App. No. 1701399.6, filed on Jan. 27, 2017. Each application referenced in this paragraph is incorporated by reference as if set forth fully herein.

FIELD OF THE DISCLOSURE

The present invention relates to the field of cooking apparatus, and in particular, cooking apparatus comprising an oven.

BACKGROUND TO THE DISCLOSURE

Wood-fired ovens are commonly used in commercial kitchens for the cooking of baked goods (including pizzas), meats, vegetables and other foodstuffs. In particular, such ovens provide the very high temperatures required to cook dough-based products adequately and to provide foodstuffs such as pizzas with a characteristically smoky or charred flavor. However, wood-fired ovens are typically too large and expensive for domestic use.

Smaller and more economical wood-fired ovens adapted for domestic use or for portability (for example, for use at picnics or when camping) have been devised. Such portable wood-fired ovens are typically better at cooking dough-based products than conventional domestic ovens (e.g., gas or electric domestic ovens). Nevertheless, it is still difficult to achieve the temperatures required for an optimum pizza cooking result (as is achieved in a commercial kitchen) without using substantial quantities of fuel (i.e., wood).

Some embodiments of the present invention aim to provide an improved oven which permits higher cooking temperatures to be achieved with a smaller quantity of fuel. Some embodiments of the invention aim to provide an oven whose temperature and/or fuel consumption is controllable. Some embodiments of the invention aim to provide multiuse ovens. Some embodiments of the invention aim to improve the design and function of portable ovens.

SUMMARY OF THE DISCLOSURE

A first aspect of the invention provides cooking apparatus comprising an oven, the oven comprising a cooking chamber, a heated air source and two or more vents through which, in use, heated air can vent (e.g., vents) from the cooking chamber. The two or more vents comprise at least one lower vent and at least one upper vent. The at least one lower vent is provided at a lower (i.e., vertical) height than the at least one upper vent. The at least one upper vent is controllable to regulate a flow of heated air therethrough.

Because the at least one lower vent is provided at a lower (i.e., vertical) height than the at least one upper vent, cooler air (being more dense) is typically vented through the at least one lower vent and warmer air (being less dense) is typically vented through the at least one upper vent. Because the at least one upper vent is controllable to regulate the flow of heated air therethrough, the flow of heated air out of the cooking chamber can also be (i.e., at least partially) regulated. When more heated air is permitted to vent through the at least one upper vent (e.g., when the rate of heated air flow through the at least one upper vent is greater), the average temperature in the cooking chamber is typically lower than when less heated air is permitted to vent through the at least one upper vent (e.g., when the rate of heated air flow through the at least one upper vent is lower). When less heated air is permitted to vent through the at least one upper vent (e.g., when the rate of heated air flow through the at least one upper vent is lower), the average temperature in the cooking chamber is typically greater than when more heated air is permitted to vent through the at least one upper vent (e.g., when the rate of heated air flow through the at least one upper vent is greater). When less heated air is permitted to vent through the at least one upper vent, heated air is also typically redirected away from the at least one upper vent towards the at least one lower vent, thereby causing (or increasing) the circulation of heated air within the cooking chamber.

The at least one upper vent may be controllable to reversibly restrict (e.g., prevent or block) the flow of heated air therethrough.

When the (e.g., rate of) flow of heated air through the at least one upper vent is restricted (i.e., low, for example negligible or zero), a total heated air flow path length for heated air travelling through the cooking chamber (i.e., from the heated air source and through the cooking chamber until said heated air vents from the cooking chamber) is typically increased. The (e.g., rate of) flow of heated air through the at least one upper vent being restricted (i.e., low, for example negligible or zero) therefore typically causes heated air to spend more time in the cooking chamber (e.g., a heated air residence time within the cooking chamber is increased). Accordingly, the average temperature of air within the cooking chamber is typically increased by restricting the flow of heated air through the at least one upper vent.

Additionally, when the (e.g., rate of) flow of heated air through the at least one upper vent is restricted (i.e., low, for example negligible or zero), heated air typically vents from the cooking chamber through the at least one lower vent. Accordingly, when the (e.g., rate of) flow of heated air through the at least one upper vent is restricted (i.e., low, for example negligible or zero), the flow of heated air from the cooking chamber through the at least one lower vent is increased. The (e.g., rate of) flow of heated air through the at least one upper vent being restricted (i.e., low, for example negligible or zero) typically causes circulation of heated air within the cooking chamber as heated air flows from the restricted at least one upper vent towards the at least one lower vent. Circulation of heated air within the cooking chamber typically results in a more even heat distribution within the cooking chamber.

The efficacy and the efficiency of the cooking chamber in the cooking of foods is therefore typically increased by restricting the (e.g., rate of) flow of heated air through the at least one upper vent. This effect is typically enhanced when the cooking chamber is used to cook baked goods and, in particular, breads or pizzas which require very high cooking temperatures for a satisfactory cooking result. For example, pizzas cooked at higher temperatures (e.g., 450° C. and higher) typically have a crispy base and/or crust with an interior that is light and not dense or overly chewy. In comparison, pizzas cooked at lower temperatures (e.g., 250° C.) must typically be cooked for longer times, allowing moisture to evaporate from the pizza dough, resulting in a dense and overly chewy crust.

It may be that the at least one upper vent comprises flow regulation means (e.g., a flow regulator). The flow regulation means may be adjustable (e.g., switchable) between two or more flow regulation configurations. For example, the flow regulation means may be adjustable (e.g., switchable)

between an open configuration in which heated air can flow (e.g., (i.e., relatively) unimpeded) through the at least one upper vent and a closed configuration in which heated air is restricted (e.g., prevented or blocked) from flowing through said at least one upper vent. It may be that the flow regulation means is continuously adjustable between said two or more flow regulation configurations (e.g., said open configuration and said closed configuration).

The flow regulation means (e.g., the flow regulator) may comprise at least one movable portion. The at least one movable portion may be movable between two or more flow regulation positions. For example, the at least one movable portion may be movable between an open position in which heated air can flow (e.g., (i.e., relatively) unimpeded) through the at least one upper vent and a closed position in which heated air is restricted (e.g., prevented or blocked) from flowing through said at least one upper vent. The at least one movable portion may be continuously movable between the two or more flow regulation positions (e.g., the open position and the closed position). The at least one movable portion may be a movable (e.g., slidable) wall. The at least one movable portion may be a movable (e.g., slidable) gate.

The at least one movable portion may be a rotatable portion, for example a rotatable wall or a rotatable gate. It may be that the rotatable portion is configured (e.g., located) such that rotation of the said rotatable portion reversibly covers and/or uncovers an aperture (i.e., through which heated air may vent).

The flow regulation means may comprise (e.g., be) a valve operable to regulate the flow of heated air through the at least one upper vent. The flow regulation means may comprise a valve control mechanism operable to open the valve such that heated air can flow (e.g., (i.e., relatively) unimpeded) through the at least one upper vent. The valve control mechanism may also be operable to close the valve such that flow of heated air through the at least one upper vent is restricted (e.g., prevented or blocked).

The at least one lower vent is not typically (e.g., independently) controllable to regulate a flow of heated air therethrough. The at least one lower vent does not typically comprise flow regulation means (e.g., a flow regulator). The at least one lower vent is typically provided in a fixed, open configuration.

The cooking apparatus typically comprises at least one flue. It may be that, in use, heated air can vent (e.g., vents) from the cooking chamber through the at least one lower vent into the at least one flue. It may be that, in use, heated air can vent (e.g., vents) from the cooking chamber through the at least one upper vent into the at least one flue. It may be that, in use, heated air can vent (e.g., vents) from the cooking chamber through one or more of the at least one lower vent and the at least one upper vent into the at least one flue.

It may be that the at least one lower vent is provided directly between the cooking chamber and the at least one flue. It may be that the at least one lower vent forms a passage between the cooking chamber and the at least one flue. For example, it may be that the at least one lower vent is provided in a wall (e.g., a wall of the cooking chamber and/or the at least one flue) separating the at least one cooking chamber from the at least one flue. The at least one lower vent may comprise (e.g., be) an aperture in said wall.

It may be that the at least one upper vent is provided directly between the cooking chamber and the at least one flue. It may be that the at least one upper vent forms a passage between the cooking chamber and the at least one flue. For example, it may be that the at least one upper vent is provided in a wall (e.g., a wall of the cooking chamber and/or the at least one flue) separating the at least one cooking chamber from the at least one flue. The at least one upper vent may comprise (e.g., be) an aperture in said wall.

The oven may comprise at least one heated air channel. It may be that, in use, heated air can vent (e.g., vents) from the cooking chamber through one or more of the at least one lower vent and the least one upper vent into the at least one heated air channel. It may be that the at least one heated air channel is configured to guide heated air (i.e., venting from the cooking chamber through the one or more of the at least one lower vent and the at least one upper vent) into the flue.

The at least one heated air channel may extend along at least a portion of an interior wall of the cooking chamber.

It may be that the interior of the cooking chamber is bounded (i.e., at least in part) by two or more opposing interior walls. For example, it may be that the interior of the cooking chamber is bounded by two or more opposing lateral interior walls. The two or more opposing lateral interior walls are typically substantially vertical walls. It may be that the cooking chamber is bounded by the two or more opposing lateral interior walls and a rear interior wall. The rear interior wall typically faces a food-receiving open end of the cooking chamber. The two or more lateral interior walls typically extend between the rear interior wall and the food-receiving open end of the cooking chamber.

The at least one upper vent and/or the at least one lower vent may be positioned closer to the food-receiving end of the cooking chamber than the rear interior wall of the cooking chamber. The (i.e., horizontal) distance between the at least one upper vent and/or the at least one lower vent and the food-receiving end of the cooking chamber may be less than or equal to 20% of the (i.e., horizontal) length of the cooking chamber (i.e., between the food-receiving end and the rear interior wall). The at least one upper vent and/or the at least one lower vent may be positioned adjacent to (e.g., at) the food-receiving end of the cooking chamber.

At least part of the at least one heated air channel may extend (e.g., substantially) vertically along at least a portion of a lateral interior wall of the cooking chamber.

The at least one heated air channel may be (i.e., at least partially) enclosed. The at least one heated air channel may be (i.e., at least partially) separated from an interior of the cooking chamber by one or more walls. For example, the at least one heated air channel may be (i.e., at least partially) separated from the interior of the cooking chamber by one or more interior walls (e.g., one or more lateral interior walls) of the said cooking chamber. The at least one heated air channel may be (i.e., at least partially) separated from the interior of the cooking chamber by one or more heated air channel walls.

The oven may comprise first and second heated air channels. It may be that, in use, heated air can vent (e.g., vents) from the cooking chamber through a first lower vent into the first heated air channel and that heated air can also vent (e.g., vents) from the cooking chamber through a second lower vent into the second heated air channel. It may be that both said first and second heated air channels are configured to guide heated air into the flue. It may be that at least a part of the first heated air channel extends (e.g., substantially) vertically along at least a portion of a first lateral interior wall of the cooking chamber and that at least a part of the second heated air channel extends (e.g., substantially) vertically along at least a portion of a second lateral interior wall of the cooking chamber. It may be that the first lateral interior wall of the cooking chamber faces (i.e., is located opposite) the second lateral interior wall of the cooking chamber.

It may be that the oven comprises an oven door. The oven door is typically moveable between a closed position, in which the (i.e., interior of the) cooking chamber is (i.e., at least partially) sealed from an external atmosphere (i.e., outside the oven), and an open position, in which the (i.e., interior of the) cooking chamber is externally accessible (i.e., from outside the oven).

The oven door typically removably seals a food-receiving opening of the oven (e.g., and/or the cooking chamber) when the oven door is provided in the closed position. The food-receiving opening is typically accessible by a user (for example, for the provision, inspection or removal of food items within the cooking chamber) when the oven door is provided in the open position.

The oven door may be hingedly attached to the oven such that moving the oven door between the open and closed positions comprises rotating the oven door about a hinge.

The oven door may be releasably mountable within the food-receiving opening such that moving the oven door between the open and closed positions comprises mounting and/or unmounting the oven door within the food-receiving opening.

It may be that the oven door comprises a handle, for example a thermally-insulated handle.

The flue may comprise flow regulation means (i.e., a flow regulator). The flue may comprise a movable wall (e.g., a rotatable wall) configured such that movement of the movable wall (e.g., rotation of the rotatable wall) regulates the flow of heated air through the said flue.

The heated air source is typically provided at a lower (i.e., vertical) height than the at least one upper vent such that heated air flowing from the heated air source flows upwards through the cooking chamber towards at the least one upper vent. Accordingly, when heated air is permitted to vent through the at least one upper vent, heated air typically flows upwards away from the heated air source towards and through the at least one upper vent, without spending a significant period of time within the cooking chamber.

By upper and lower and related terms, we refer to directions with reference to the orientation in which the oven is configured to be used. Thus, the skilled person will understand that the at least one lower vent is typically provided at a lower (e.g., vertical) height than the at least one upper vent in normal use. For example, the oven typically has a roof (from which a flue may extend) on an upper surface and a base (from which, for example, legs may extend to support the oven on a surface such as the ground) on a lower surface, and the distance between the at least one lower vent and the base of the oven is typically less than the distance between the at least one upper vent and the said base of the oven. Similarly, the cooking chamber typically has a floor (on which food may be positioned during cooking) and a ceiling vertically above the floor, and the distance between the at least one lower vent and the floor is typically less than the distance between the at least one upper vent and the floor.

The at least one upper vent may be located in an upper half of the cooking chamber. The at least one upper vent may be located in an upper quarter of the cooking chamber. The at least one upper vent may be located at (e.g., in) the ceiling of the cooking chamber.

The at least one lower vent may be located in a lower half of the cooking chamber. The at least one lower vent may be located in a lower quarter of the cooking chamber. The at least one lower vent may be located adjacent to (e.g., at) the floor of the cooking chamber.

The at least one upper vent may be positioned in an upper half of the cooking chamber, or more preferably at the top of the cooking chamber (for example in the ceiling of the cooking chamber) such that, when heated air is not permitted to flow through said at least one upper vent, heated air is caused to circulate within an upper portion (e.g., upper half) of the cooking chamber. Preferably, however, when heated air is not permitted to flow through said at least one upper vent, heated air is caused to circulate within the majority (e.g., the entirety) of the cooking chamber.

Circulation of heated air within (e.g., an upper(most) portion) of the cooking chamber typically causes preferential displacement of cooler, and thus less dense, air from the cooking chamber through the at least one lower vent.

It may be that the heated air source and the at least one upper vent are laterally displaced from one another (i.e., displaced along a horizontal direction perpendicular to a height of the oven and/or the cooking chamber). It may be that the heated air source and the at least one upper vent are displaced from another along a length of the cooking chamber. It may be that the least one upper vent is provided (e.g., laterally, i.e., in a horizontal direction) between the at least one heated air source and the food-receiving opening of the oven. It may be that the at least one upper vent is provided beneath (e.g., directly beneath) the flue.

It may be that the oven is (i.e., configured as) a portable oven. For example, the oven may be smaller and/or lighter than a conventional oven such that the oven may be moved easily by a user. It may be that the oven is provided with legs, feet, castors, rollers, wheels and/or an oven stand such that the oven may be safely positioned on the floor or on the ground outside during use. It may be that a (i.e., external) housing of the oven is (i.e., thermally) insulated such that a user may safely handle one or more external portions of the oven during use.

It may be that the oven is a pizza oven. A pizza oven is an oven configured for cooking one or more pizzas. It may be that the cooking chamber is configured for cooking one or more pizzas. It may be that the cooking chamber is dimensioned and sized for cooking one or more pizzas. A cooking chamber configured for cooking one or more pizzas typically has a (e.g., interior) length and/or a (e.g., interior) breadth (i.e., substantially) greater than a (e.g., interior) vertical height of the cooking chamber.

It may be that the heated air source comprises a fuel burner. The fuel burner may be configured to burn one or more of the following combustible fuels: wood chips, wood pellets, coal, split wood, twigs, gas, oil. Alternatively, the heated air source may be an electrical heated air source comprising an electric heating element.

A second aspect of the invention provides cooking apparatus comprising an oven, the oven comprising a cooking chamber, a heated air source and a demountable, hinged oven door.

The oven door is typically hingedly movable between a closed position, in which external access (i.e., from outside the oven) to the cooking chamber is restricted (e.g., prevented), and an open position, in which the (e.g., interior of) cooking chamber is externally accessible (i.e., from outside the oven). The cooking chamber may be (e.g., at least partially) sealed from an external atmosphere (i.e., outside the oven) when the oven door is in the closed position.

Because the oven door is hinged, the said door may be easily opened and closed. Because the oven door is demountable, it may be easily removed for cleaning or to be replaced by an alternative oven door.

It may be that the oven door is mountable to the oven by way of cooperating retaining formations. The cooperating retaining formations are typically configured such that the oven door is demountable from the oven.

It may be that the oven door, when mounted to the oven, is retained in either of the open and the closed positions by the said cooperating retaining formations. However, the oven door is not typically fixedly attached to the oven when the oven door is mounted to the oven by the cooperating retaining formations. The oven door is not typically fixedly attached to the oven by the cooperating retaining formations. Accordingly, a user can easily demount (i.e., remove) the oven door from the oven to which it is mounted by the cooperating retaining formations.

The oven door may be mounted to the oven by way of first and second cooperating retaining formations, the first cooperating retaining formations being provided towards (e.g., at) a first (e.g., lateral) side of the said oven door and the second cooperating retaining formations being provided towards (e.g., at) an opposing second (e.g., lateral) side of the oven door.

The cooperating retaining formations (e.g., the first and second cooperating retaining formations) are typically provided towards (e.g., at) a lower(most) edge of the oven door.

The oven door may comprise a (e.g., thermally insulated) handle.

The oven door may comprise a viewing port. The viewing port may be made of one or more transparent materials. The viewing port may be made of glass.

The oven door may comprise a food-receiving aperture. The food-receiving aperture may extend (e.g., laterally) along a length of the oven door. The food-receiving aperture may be configured to receive a pizza such that a pizza may be inserted into and/or removed from the interior of the cooking chamber when the door is in the closed position.

The oven may comprise a flue. The oven may comprise one or more vents through which heated air can vent (e.g., vents) from the cooking chamber (e.g., into the flue).

It may be that the oven is (i.e., configured as) a portable oven. For example, the oven may be smaller and/or lighter than a conventional oven such that the oven may be moved easily by a user. It may be that the oven is provided with legs, feet, castors, rollers, wheels and/or an oven stand such that the oven may be safely positioned on the floor or on the ground outside during use. It may be that a (i.e., external) housing of the oven is (i.e., thermally) insulated such that a user may safely handle one or more external portions of the oven during use.

It may be that the oven is a pizza oven. A pizza oven is an oven configured for cooking one or more pizzas. It may be that the cooking chamber is configured for cooking one or more pizzas. It may be that the cooking chamber is dimensioned and sized for cooking one or more pizzas. A cooking chamber configured for cooking one or more pizzas typically has a (e.g., interior) length and/or a (e.g., interior) breadth (i.e., substantially) greater than a (e.g., interior) vertical height of the cooking chamber.

It may be that the heated air source comprises a fuel burner. The fuel burner may be configured to burn one or more of the following combustible fuels: wood chips, wood pellets, coal, split wood, twigs, gas, oil. Alternatively, the heated air source may be an electrical heated air source comprising an electric heating element.

A third aspect of the invention provides a kit of parts comprising an oven and first and second oven doors. The oven comprises a cooking chamber and a heated air source. Each of the first and second oven doors are mountable to the oven.

The first oven door is not typically mountable to the oven when the second oven door is mounted to the oven. The second oven door is not typically mountable to the oven when the first oven door is mounted to the oven.

The first and second oven doors may be interchangeable oven doors.

Each of the first and second oven doors may be mountable to the oven by way of cooperating retaining formations.

Each of the first and second oven doors may be hinged.

A fourth aspect of the invention provides cooking apparatus comprising an oven, the oven comprising a cooking chamber extending between a burner unit and a flue, the burner unit comprising a combustion chamber configured to receive combustible fuel through an adjustable fuel inlet. The adjustable fuel inlet is adjustable to control the rate of flow of combustible fuel into the combustion chamber.

It may be that an internal dimension of the fuel inlet is adjustable (e.g., variable). For example, it may be that an internal width of the fuel inlet is adjustable (e.g., variable). It may be that (i.e., an interior of) the fuel inlet is (i.e., substantially) cylindrical and that an internal diameter of the fuel inlet is adjustable (e.g., variable). It may be that an internal cross-sectional area (i.e., in a substantially horizontal plane) of the fuel inlet is adjustable (e.g., variable).

The adjustable fuel inlet typically comprises fuel flow control means. The fuel flow control means may comprise at least one movable portion. It may be that the at least one movable portion is movable to adjust (e.g., vary), in use, the (i.e., rate of) flow of combustible fuel through the fuel inlet. The at least one movable portion may be movable between two or more fuel flow control configurations (e.g., positions). The at least one movable portion may be continuously movable between the two or more fuel flow control configurations (e.g., positions). It may be that movement of the at least one movable portion between the two or more fuel flow control configurations (e.g., positions) causes the internal dimension (e.g., internal width, diameter and/or cross-sectional area) to vary.

The at least one movable portion may be a movable wall. The at least one movable portion may be a movable gate. The movable wall or gate may be inclined with respect to a (e.g., substantially vertical) longitudinal axis of the adjustable fuel inlet. Movement of the at least one movable portion may comprise varying an angle of incline of the movable wall or gate relative to the (e.g., substantially vertical) longitudinal axis of the adjustable fuel inlet.

It may be that the adjustable fuel inlet comprises a bore or channel. It may be that the movable wall is provided within the bore or channel at an inclined angle with respect to the longitudinal axis of the said bore or channel. It may be that the adjustable fuel inlet further comprises incline adjustment means. The angle of incline of the movable wall with respect to the longitudinal axis of the bore or channel may typically be adjusted by way of the incline adjustment means. The incline adjustment means may comprise a screw extending through an external wall of the adjustable fuel inlet. A first end of the screw typically contacts the movable wall within the bore or channel. A second end of the screw typically extends beyond an external surface of the external wall of the adjustable fuel inlet. A user may therefore adjust the angle of incline of the movable wall by turning the second end of the screw.

The adjustable fuel inlet may comprise a fuel hopper having a variable outlet. The fuel hopper may be a fuel funnel having a movable wall. Movement of the movable wall of the fuel funnel typically varies the rate of flow of fuel out of the fuel hopper and into the combustion chamber.

The burner unit (i.e., the combustion chamber of the burner unit) may be configured to burn one or more of the following combustible fuels: wood chips, wood pellets, coal, split wood, twigs, gas, oil. The adjustable fuel inlet may be (i.e., substantially) elongate.

A (i.e., substantially) elongate fuel inlet can comfortably receive a wider range of combustible fuels, as split wood and twigs are typically elongate.

The burner unit may be a removable burner unit. The removable burner unit may be removably (i.e., demountably) mounted or mountable to the oven. Removal of the burner unit typically facilitates cleaning and repair of the burner unit and/or the oven. Removal of the burner unit also typically permits the burner unit to be replaced by alternative burner units.

It may be that the oven is (i.e., configured as) a portable oven. For example, the oven may be smaller and/or lighter than a conventional oven such that the oven may be moved easily by a user. It may be that the oven is provided with legs, feet, castors, rollers, wheels and/or an oven stand such that the oven may be safely positioned on the floor or on the ground outside during use. It may be that a (i.e., external) housing of the oven is (i.e., thermally) insulated such that a user may safely handle one or more external portions of the oven during use.

It may be that the oven is a pizza oven. A pizza oven is an oven configured for cooking one or more pizzas. It may be that the cooking chamber is configured for cooking one or more pizzas. It may be that the cooking chamber is dimensioned and sized for cooking one or more pizzas. A cooking chamber configured for cooking one or more pizzas typically has a (e.g., interior) length and/or a (e.g., interior) breadth (i.e., substantially) greater than a (e.g., interior) vertical height of the cooking chamber.

A fifth aspect of the invention provides cooking apparatus comprising an oven and first and second burner units each configured to receive combustible fuel. The oven comprises a cooking chamber and a flue. The first burner unit is mountable to the oven through an external wall of said oven. The second burner unit is mountable within the cooking chamber.

The first burner unit is not typically mountable to the oven when the second burner unit is mounted within the cooking chamber. The second burner unit is not typically mountable within the cooking chamber when the first burner unit is mounted to the oven through the external wall.

At least a portion (i.e., an external portion) of the first burner unit typically extends externally away from the external wall of the oven when the first burner unit is mounted to said external wall. At least another portion (i.e., an internal) portion of the first burner unit typically extends through the external wall of the oven into an interior of the oven when the first burner unit is mounted to said external wall. Combustion of fuel typically occurs in the at least a portion (i.e., the external portion) of the first burner unit which extends externally away from the external wall of the oven when the first burner unit is mounted to the oven through said external wall. Accordingly, the first burner unit typically functions as an external burner unit.

The cooking chamber is typically internal to the oven, that is to say it is an internal cooking chamber. Accordingly, the second burner unit, when mounted within the cooking chamber, typically functions as an internal burner unit.

The second burner unit may comprise (e.g., be) a burner tray configured to receive combustible fuel. The burner tray is typically configured (e.g., shaped) to fit against a portion of the interior of the cooking chamber. The burner tray may be shaped to conform to the shape of a portion of the interior of the cooking chamber.

The first burner unit may be configured to burn one or more of the following combustible fuels: wood chips, wood pellets, coal, split wood, twigs, gas, oil. The second burner unit may be configured to burn one or more of the following combustible fuels: wood chips, wood pellets, coal, split wood, twigs, gas, oil.

It may be that both the first and second burner units are configured to burn the same one or more combustible fuels. Alternatively, it may be that the first burner unit and the second burner unit are configured to burn different combustible fuels from each other. For example, it may be that the first burner unit is configured to burn wood chips and/or wood pellets and that the second burner unit is configured to burn split wood and/or twigs.

It may be that the oven is (i.e., configured as) a portable oven. For example, the oven may be smaller and/or lighter than a conventional oven such that the oven may be moved easily by a user. It may be that the oven is provided with legs, feet, castors, rollers, wheels and/or an oven stand such that the oven may be safely positioned on the floor or on the ground outside during use. It may be that a (i.e., external) housing of the oven is (i.e., thermally) insulated such that a user may safely handle one or more external portions of the oven during use.

It may be that the oven is a pizza oven. A pizza oven is an oven configured for cooking one or more pizzas. It may be that the cooking chamber is configured for cooking one or more pizzas. It may be that the cooking chamber is dimensioned and sized for cooking one or more pizzas. A cooking chamber configured for cooking one or more pizzas typically has a (e.g., interior) length and/or a (e.g., interior) breadth (i.e., substantially) greater than a (e.g., interior) vertical height of the cooking chamber.

A sixth aspect of the invention provides a method of using the cooking apparatus according to the fifth aspect of the invention, the method comprising: mounting the first burner unit to the oven; burning fuel (optionally chipped or pelleted fuel (e.g., wood chips or wood pellets) or gas) in the first burner unit; demounting the first burner unit from the oven; subsequently mounting the second burner unit within the cooking chamber; and burning fuel (optionally split wood and/or twigs, or chipped or pelleted fuel) in the second burner unit.

A seventh aspect of the invention provides a method of using the cooking apparatus according to the fifth aspect of the invention, the method comprising: mounting the second burner unit within the cooking chamber; burning fuel (for example split wood and/or twigs, or chipped or pelleted fuel) in the second burner unit; demounting the second burner unit from the oven; subsequently mounting the first burner unit to the oven; and burning chipped or pelleted fuel (e.g., wood chips or wood pellets), or gas, in the first burner unit.

An eighth aspect of the invention provides cooking apparatus comprising an oven, the oven comprising a cooking chamber, a demountable burner unit, a demountable, hinged oven door, and two or more vents through which, in use, heated air can vent (e.g., vents) from the cooking chamber. The two or more vents comprise at least one lower vent and at least one upper vent. The at least one lower vent is provided at a lower height than the at least one upper vent. The at least one upper vent is controllable to regulate a flow of heated air therethrough.

The demountable burner unit may comprise a combustion chamber configured to receive combustible fuel through an adjustable fuel inlet.

The demountable burner unit may be mountable or mounted to the oven through an external wall of said oven. Alternatively, the demountable burner unit may be mountable within the cooking chamber.

It may be that the cooking apparatus comprises a first demountable burner unit and a second demountable burner unit, the first demountable burner unit being mountable or mounted to the oven through the external wall of said oven and the second demountable burner unit being mountable or mounted within the cooking chamber, wherein the first burner unit is not mountable or mounted to the oven when the second burner unit is mounted within the cooking chamber and the second burner unit is not mountable or mounted within the cooking chamber when the first burner unit is mounted to the oven through the external wall.

The oven may be a pizza oven. A pizza oven is an oven configured for cooking one or more pizzas.

Optional and preferred features of any one aspect of the invention may be features of any other aspect of the invention.

DESCRIPTION OF THE DRAWINGS

An example embodiment of the present invention will now be illustrated with reference to the following Figures in which:

FIG. 3 is a view from above of the portable oven of FIG. 1;

FIG. 4 is a view from the front of the portable oven of FIG. 1;

FIG. 5 is a view from the rear of the portable oven of FIG. 1;

FIG. 6 is a side view of the portable oven of FIG. 1;

FIG. 7 is a perspective view of a burner unit from the portable oven of FIG. 1;

FIG. 8 is a different perspective view of a burner unit from the portable oven of FIG. 1;

FIG. 13 is a different perspective view of the burner tray of FIG. 10;

DETAILED DESCRIPTION

Figure 1:
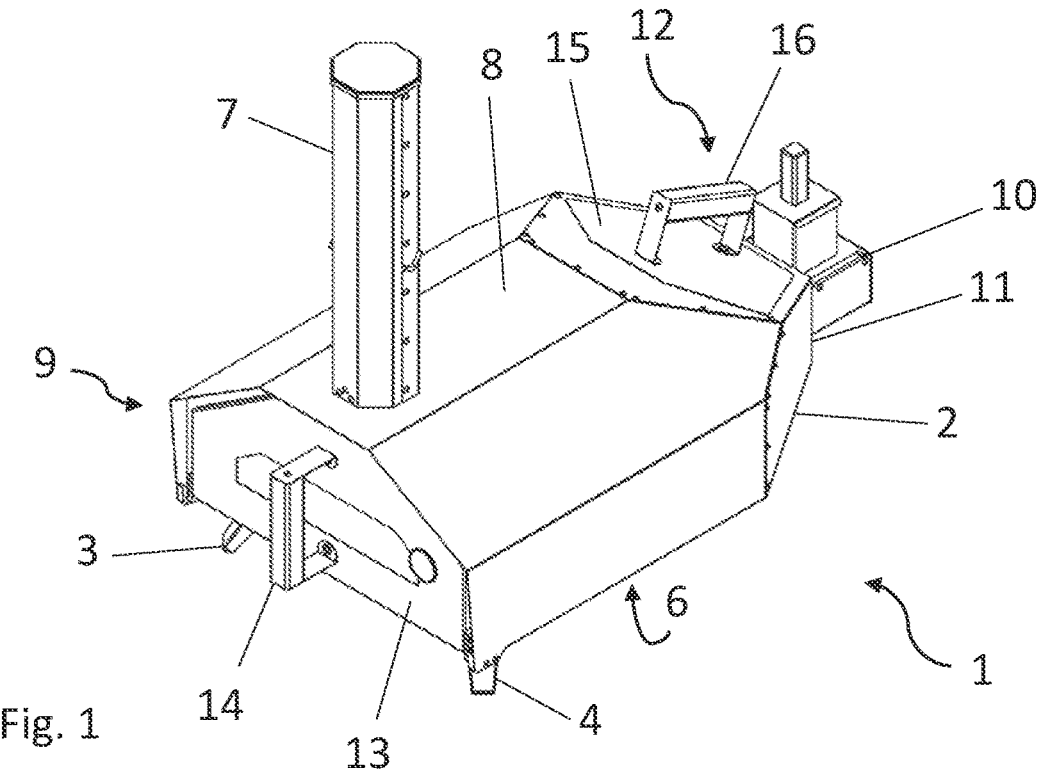
FIG. 1 is a perspective view of a portable pizza oven.
Figure 2:
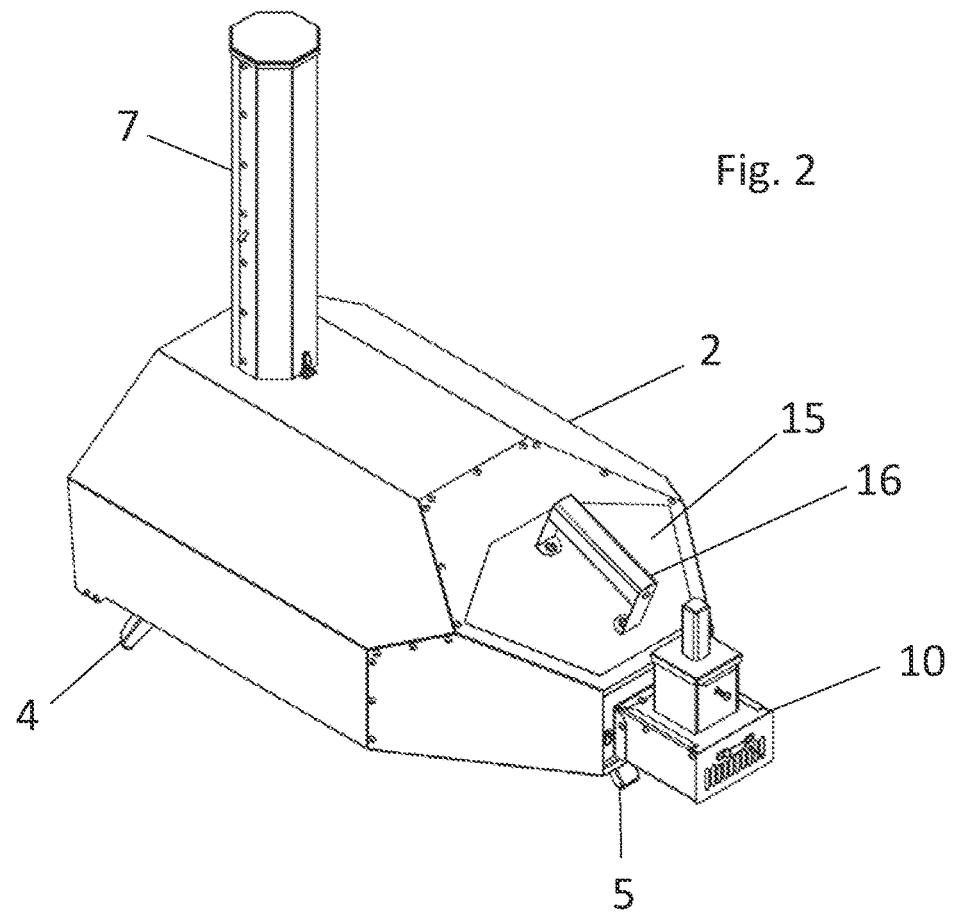
FIG. 2 is a different perspective view of the portable oven of FIG. 1.

As shown in FIGS. 1, 2, 3, 4, 5 and 6, a portable oven 1 comprises an oven body 2 supported on top of three legs 3, 4, 5 which extend from a base 6 of the body 2. A flue 7 extends from a top surface 8 of the body at a front end 9, and a removable burner 10 extends from a rear wall 11 of the body at a rear end 12. A hinged door 13 is provided at the front end 9 of the body. The hinged door 13 has an insulated handle 14. A fuel hatch lid 15 is provided in the top surface of the body at the rear end 12. The fuel hatch lid has an insulated handle 16. The oven body 2, flue 7, legs 3, 4, 5, burner 10, door 13 and fuel hatch lid 15 are constructed principally from stainless steel. The insulated handles 14 and 16 are constructed principally from wood.

Figure 9:
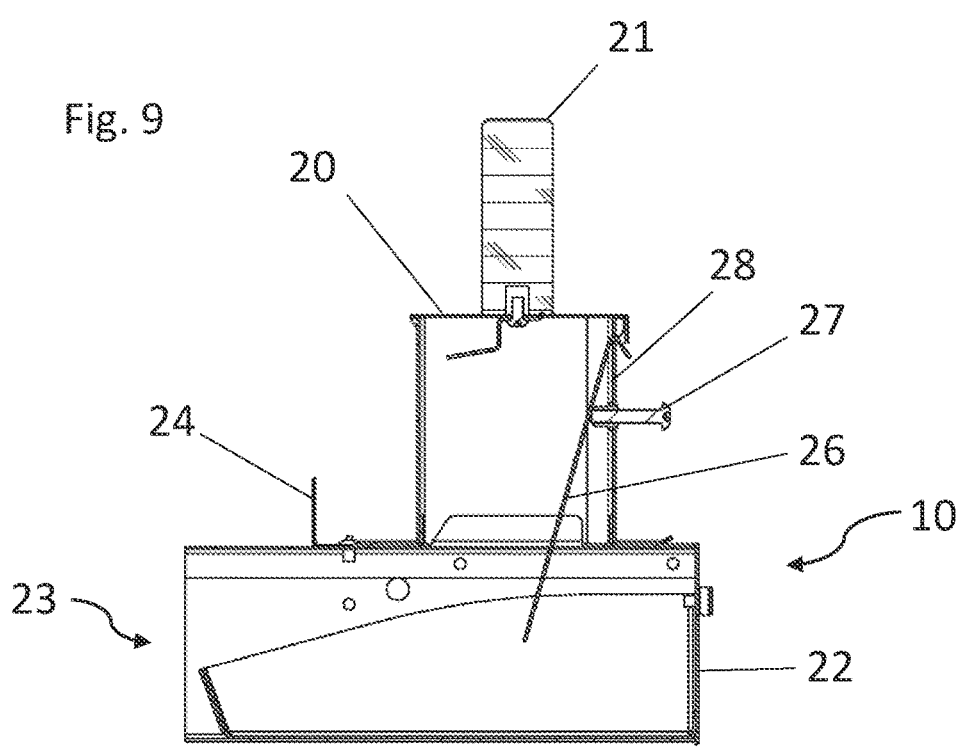
FIG. 9 is a section view of the burner unit of FIGS. 7 and 8.

The removable burner 10, as shown in more detail in FIGS. 7, 8 and 9, comprises a generally cuboidal combustion chamber 17 and generally cuboidal fuel inlet 18 extending from a top surface 19 of the combustion chamber 17. The fuel inlet 18 has a lid 20 with an insulated handle 21. A rear wall 22 of the combustion chamber is provided with a plurality of apertures functioning as air vents. A front, open end 23 of the combustion chamber is shaped and dimensioned to be slidably receivable within a corresponding rear burner opening of the oven body 2. The exterior of the combustion chamber is provided with a connecting flange 24 having two apertures 25A and 25B. The burner 10 may be attached to the oven body 2 by inserting bolts through the apertures on the connecting flange 24. A movable fuel chute 26 is mounted within the fuel inlet 18. The vertical inclination of the chute 26 is controlled by adjusting a screw 27 which extends through a rear wall 28 of the fuel inlet and contacts the chute 26. By adjusting the inclination of the chute 26, the flow of fuel into the burner 10 through the fuel inlet 18 may be controlled in use.

Figure 10:
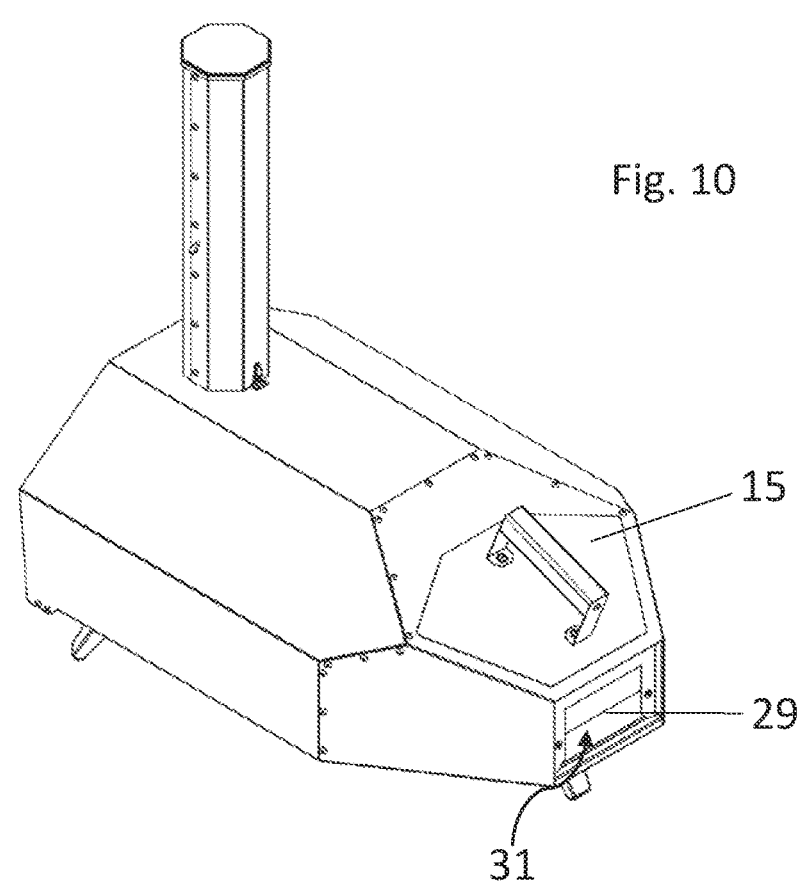
FIG. 10 is a perspective view of the portable oven of FIG. 1 with the burner unit removed and a burner tray installed within a cooking chamber.
Figures 11, 12:
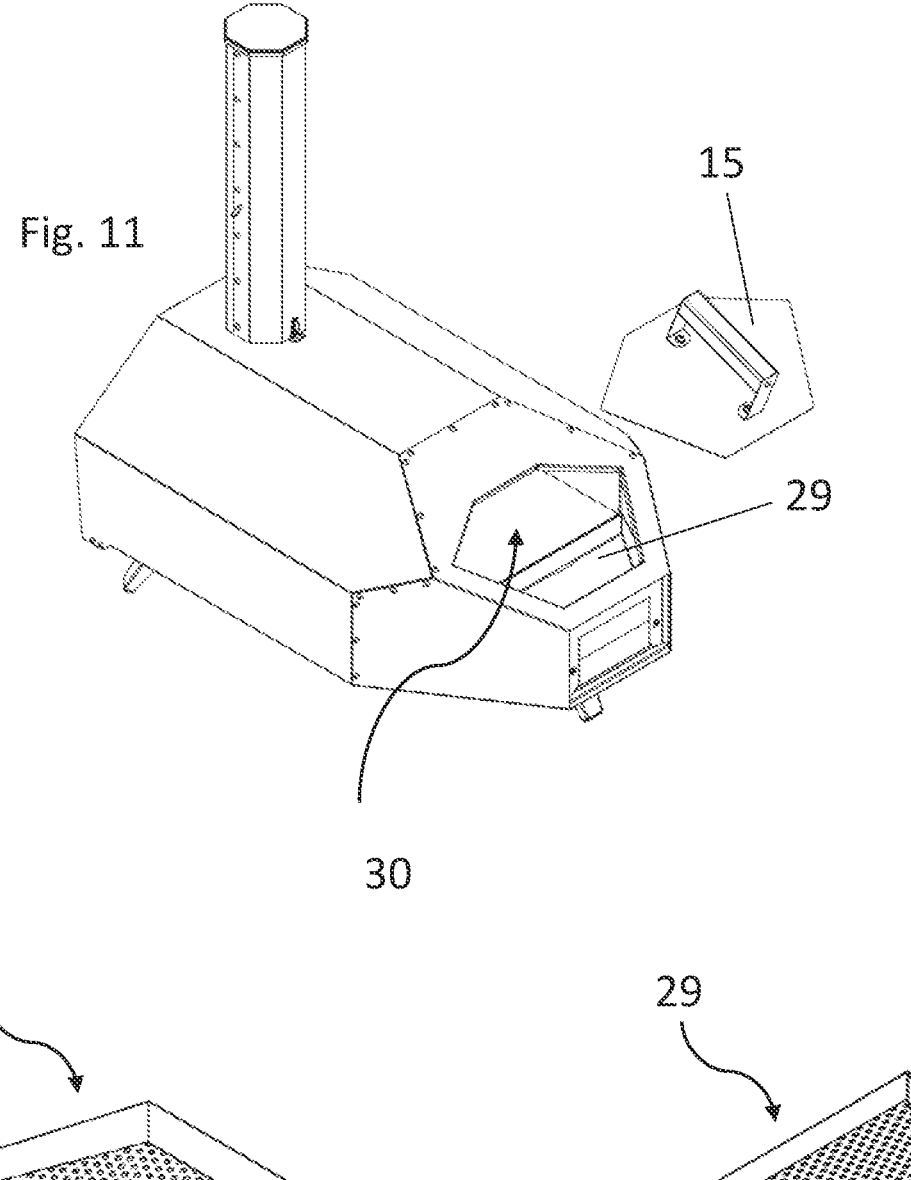
FIG. 11 is a perspective view of the portable oven of FIG. 10 with a fuel hatch lid removed.
FIG. 12 is a perspective view of the burner tray of FIG. 10.

When the removable burner 10 is removed from the oven, as shown in FIGS. 10 and 11, a removable burner tray 29, as shown in FIGS. 12 and 13, may be placed within an interior cooking chamber 30 of the oven, against the interior of the rear wall 11. The burner tray 29 may be accessed directly (for, for example, fuel loading) by removing the fuel hatch lid 15. The removable burner tray 29 is provided with an aperture 31 which functions as a vent when the removable burner tray 29 is installed within the oven.

Figure 14:
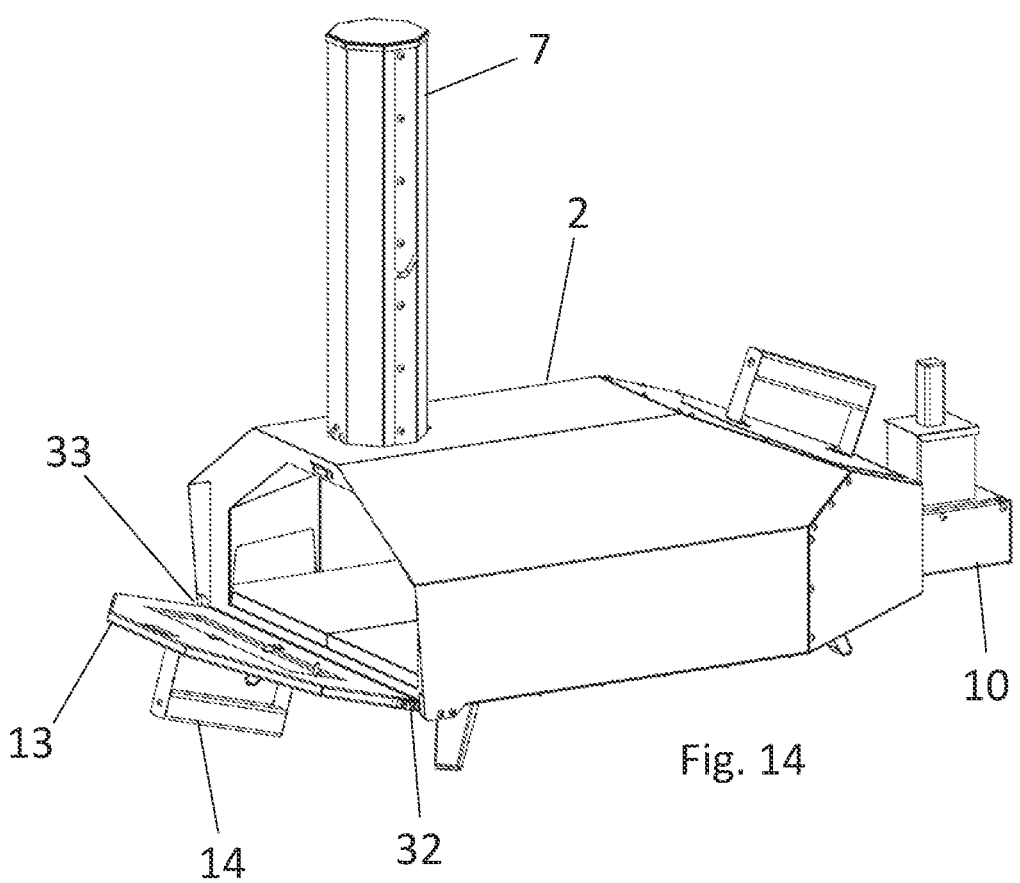
FIG. 14 is a perspective view of the portable oven of FIG. 1 with an oven door opened.
Figure 15:
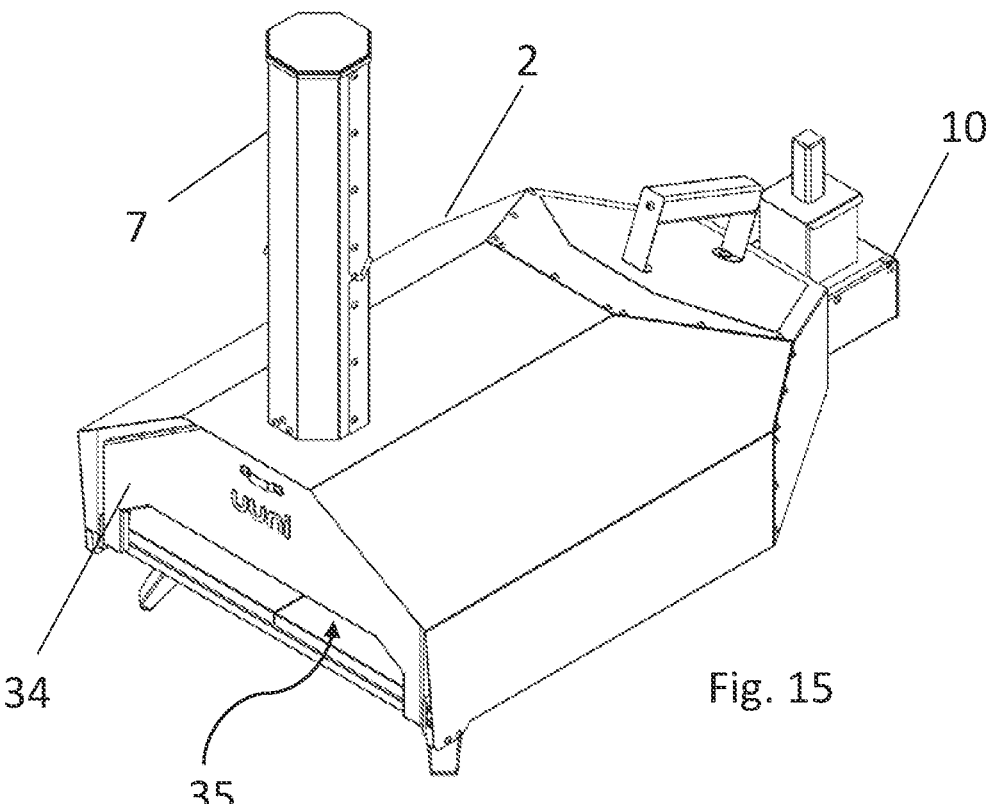
FIG. 15 is a perspective view of the portable oven of FIG. 1 with the oven door replaced by an alternative oven door.

The door 13 is mounted to the front end 9 of the oven by way of two hinges 32 and 33 located on opposing lateral sides of the door. The hinges 32 and 33 are configured such that the door can be opened (as shown in FIG. 14) by pulling the handle down and away from the oven and such that the door can be closed by pushing the handle up and towards the oven. In either of the closed or open positions, the door can be removed easily from the oven by simply lifting the door vertically upwards, releasing the door from the hinges 32 and 33. This enables the door to be removed for cleaning or repair, or for replacement with an alternative door. An alternative oven door 34 is shown in FIG. 15. The alternative door 34 includes an open aperture 35 which functions as a pizza inlet slot.

Figure 16:
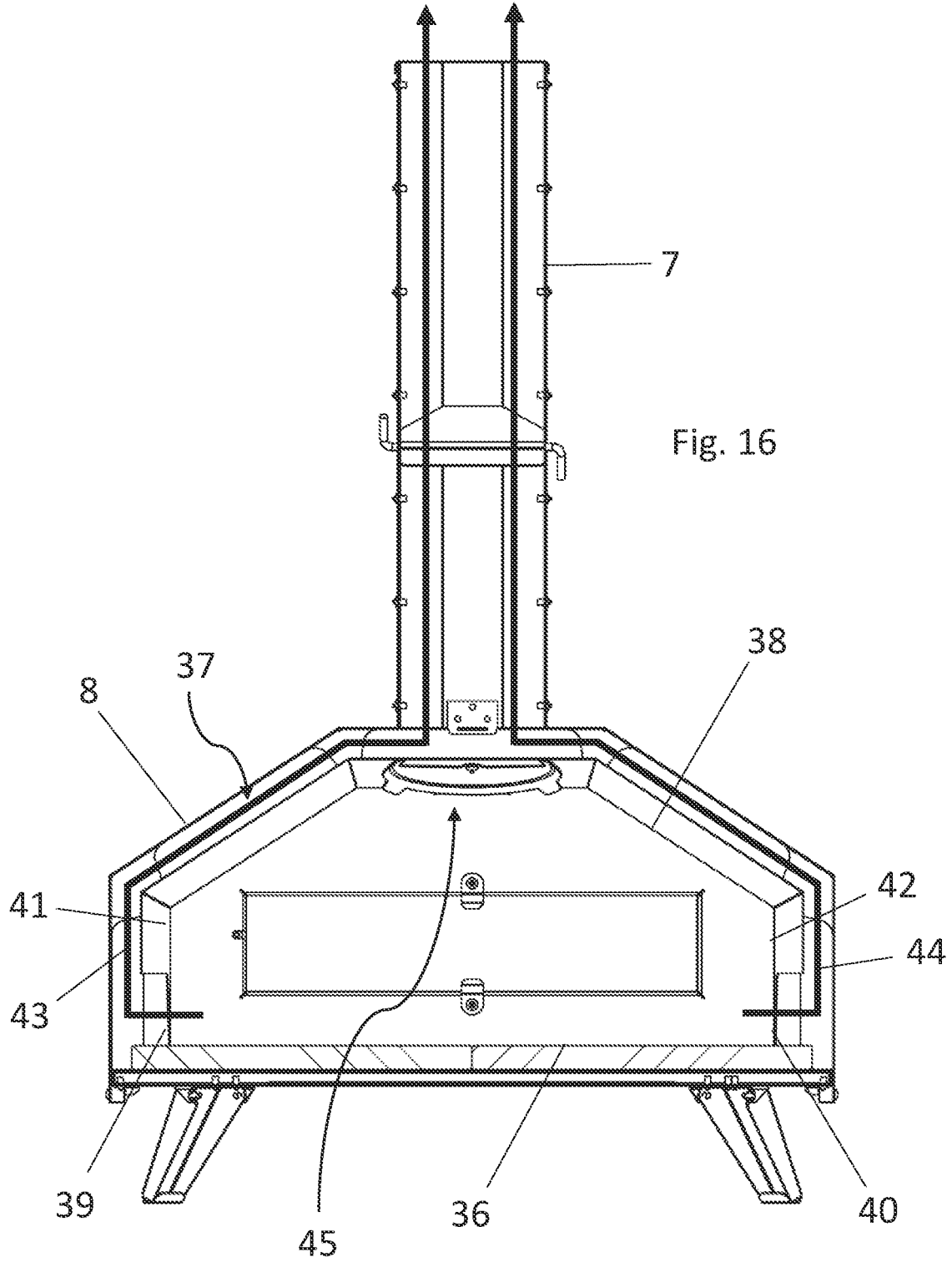
FIG. 16 is a sectional view of the portable oven of FIG. 1 illustrating the flow path of heated air through two heated air channels.

The internal structure of the oven is illustrated in FIG. 16. A cooking surface 36 made of aluminium is provided within the oven body 2, extending from the front end 9 approximately three quarters of the way towards the rear end 11 of the oven where the burner 10 is mounted. The interior of the burner 10 is in gaseous communication with the interior of the oven body 2 such that, in use, heated air and combustion products can flow from the burner into the oven. An insulating air gap 37 is provided between the top surface of the oven body 8 and a cooking chamber ceiling 38. The cooking chamber ceiling 38 is fixedly attached to the oven body 2 at the rear and sides of the oven. Two vents 39 and 40 are provided in respective lateral interior walls 41 and 42 of the cooking chamber, bringing the air gap 37 and the interior of the cooking chamber into gaseous communication with one another. The air gap 37 is also in gaseous communication with the interior of the flue 7. The air gap 37 therefore provides two channels through which air may flow between the interior of the cooking chamber and the flue (as shown by arrows 43 and 44 in FIG. 16).

Figure 17:
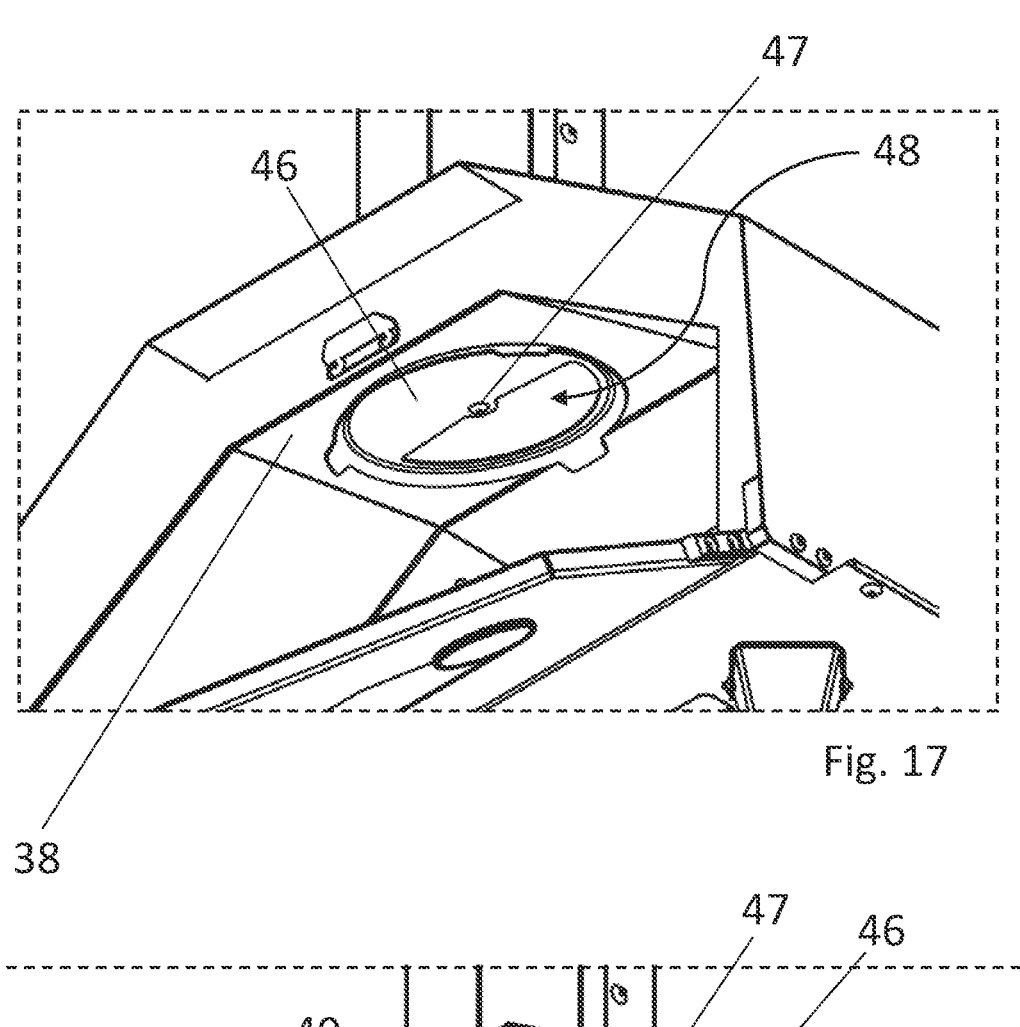
FIG. 17 is a perspective view of a controllable vent within the portable oven of FIG. 1 when the vent is closed.
Figure 18:
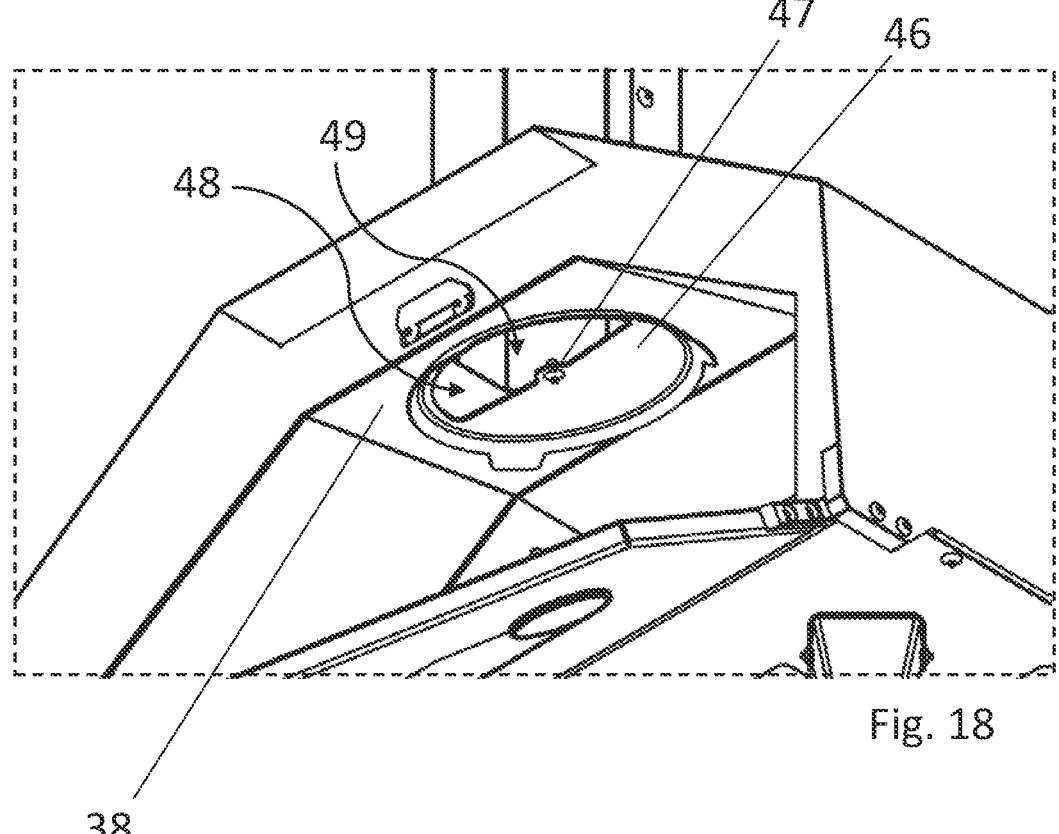
FIG. 18 is a perspective view of the controllable vent within the portable oven of FIG. 1 when the vent is open.

A controllable vent 45 is also provided in the ceiling 38 of the cooking chamber. The controllable vent 45, as shown in more detail in FIGS. 17 and 18, is formed from a generally circular vent body 46 mounted to the ceiling 38 by way of a bolt 47 about which the vent body 46 is rotatable. A semi-circular vent aperture 48 is formed in the vent body 46. The vent body is mounted to the ceiling directly beneath a semi-circular ceiling aperture 49. Rotation of the vent body 46 about the bolt 47 allows the vent to be reversibly opened and closed by bringing the semi-circular aperture of the vent body into (as shown in FIG. 18) and out of (as shown in FIG. 17) alignment with the corresponding semi-circular aperture in the ceiling. When the controllable vent 45 is open, air can flow between the interior of the cooking chamber and the flue through the controllable vent aperture 48 and the ceiling aperture 49.

In use, a user either mounts the burner 10 to the oven or inserts the burner tray 29 into the cooking chamber. The user then loads combustible fuel (such as wood chips or twigs) into the said burner 10 or burner tray 29. Fuel is loaded into the burner 10 through the controllable fuel inlet 18; fuel is loaded into the burner tray by removing the rear hatch lid 15. The combustible fuel is ignited and heated air (and combustion products) flow from the burner or burner tray into and through the cooking chamber.

As heated air is less dense than cool air, the heated air tends to flow through the cooking chamber immediately below the cooking chamber ceiling. Accordingly, when the controllable vent 45 is open, at least some of the heated air flowing immediately beneath the ceiling tends to flow upwards through the vent 45, into the flue 7, and escapes into the surrounding atmosphere. Air heated by combustion of fuel in the burner or burner tray therefore spends a relatively short period of time within the cooking chamber and only a small proportion of the heated air flows towards the base of the cooking chamber. Any food which is placed on top of the cooking surface 36 (such as a pizza) reaches a relatively low maximum cooking temperature. When the oven is used to cook pizzas, this means that an optimum pizza cooking temperature may not be achieved, resulting in an inadequately cooked pizza.

However, when the controllable vent 45 is closed by rotating the vent body 46 about the bolt 47, heated air flowing immediately beneath the ceiling of the cooking chamber is prevented from flowing through the vent aperture 48 and into the flue. Instead, the principal route for air to escape from the cooking chamber is through the two vents 39 and 40 provided in the lateral interior walls of the cooking chamber. Because the two vents 39 and 40 are located close to the cooking surface 36 at the base of the cooking chamber, it is typically cooler, denser air which escapes from the cooking chamber, flows through the channels formed within the air gap and reaches the flue 7. Heated air tends to circulate within the cooking chamber, and particularly within an upper portion of the cooking chamber, for a significant period of time before the air cools sufficiently to fall to the bottom of the chamber and escape through the two vents 39 and 40. As the heated air circulates within the cooking chamber, the average temperature of the cooking chamber is raised. Any food which is placed on top of the cooking surface (such as a pizza) reaches a higher maximum temperature than when the controllable vent is open. When the oven is used to cook pizzas, it is more likely that an optimum pizza cooking temperature is achieved, resulting in a higher quality pizza.

A user can typically adjust the rate of flow of heated air out of the cooking chamber and into the flue by rotating the vent body 46 manually, for example using a pair of tongs.

While the oven may be an oven for cooking pizzas (i.e., the size and shape of the cooking chamber is configured for cooking one or more pizzas), the oven may alternatively be configured for cooking other foodstuffs, including baked goods, roasted vegetables, casseroles, meat and fish, among others.

The cooking surface may be made of any suitable material, including aluminium, cast iron, stainless steel, stone (such as cordierite) or a ceramic material.

The oven body may be provided on legs, feet, castors, wheels or any other form of support. Alternatively, the oven body may rest directly on a (thermally insulating) work surface. The use of three legs in particular typically results in increased stability of the oven.

The burner may be configured to burn any forms of combustible fuel including, but not limited to, coal, coke, charcoal, wood, twigs, wood chips, oil or gas. Alternatively, the burner may comprise an electric heater.

Further modifications and variations may be made within the scope of the invention herein disclosed.

I claim:

1. A cooking apparatus comprising a pizza oven and first and second burner units each configured to receive combustible fuel, the oven comprising a fuel hatch and a fuel hatch lid, a cooking chamber, and at least one vent, the first burner unit being mountable to the oven through an external wall of said oven, and the second burner unit being mountable within the cooking chamber, wherein the cooking chamber comprises a cooking chamber interior, and the cooking chamber interior is bounded at least in part by two or more opposing interior lateral walls, a rear interior wall, a food receiving opening, a floor on which food may be positioned during cooking, and a ceiling vertically above the floor, wherein the cooking chamber floor comprises a cooking surface, the cooking surface comprising stone, wherein the rear interior wall faces the food receiving opening, and the two or more opposing interior lateral walls extend between the rear interior wall and the food receiving opening, and the cooking chamber interior has a length and breadth greater than a vertical height of the cooking chamber, wherein the first burner unit is not mounted or mountable to the oven when the second burner unit is mounted within the cooking chamber, and wherein the second burner unit is not mounted or mountable within the cooking chamber when the first burner unit is mounted to the oven through the external wall, wherein the first burner unit is mountable through the rear interior wall, wherein the first burner unit comprises an internal portion and an external portion, wherein the external portion of the first burner unit extends externally away from the external wall of the oven when the first burner unit is mounted within the cooking chamber, and the internal portion of the first burner unit extends through the external wall of the oven into the cooking chamber interior, wherein the first burner unit is configured to burn gas, and the second burner unit is a burner tray configured to receive and burn one or more of the following combustible fuels: wood chips, wood pellets, coal, split wood, twigs; and wherein the fuel hatch and the fuel hatch lid are formed in an upper wall of the pizza oven, such that the burner tray may be accessed directly by removing the fuel hatch lid, wherein the second burner unit comprises a combustion chamber and an adjustable fuel inlet, wherein the combustion chamber is configured to receive combustible fuel through the adjustable fuel inlet, wherein the adjustable fuel inlet is adjustable to control the rate of flow of combustible fuel into the combustion chamber, and wherein the adjustable fuel inlet comprises a fuel flow controller comprising at least one movable portion, the at least one movable portion being movable to adjust, in use, the rate of flow of combustible fuel through the fuel inlet.

2. The cooking apparatus according to claim 1, wherein the cooking apparatus further comprises a door provided at a front end of the oven; and the fuel hatch lid is provided at a rear end of the oven; and the front end of the oven and the rear end of the oven are at opposite ends of the oven.

3. The cooking apparatus according to claim 1, wherein the cooking apparatus further comprises a door which forms a side surface of the oven when the door is closed; and the fuel hatch lid is provided in a top surface of the oven.

4. The cooking apparatus according to claim 1, wherein the cooking apparatus further comprises a door provided at a front end of the oven;

the external wall of the oven through which the first burner unit is mountable is a rear wall of the oven; and the front end of the oven and the rear wall of the oven are at opposite ends of the oven.

5. The cooking apparatus according to claim 1, wherein the cooking apparatus further comprises a door provided at a front end of the oven; and the burner tray is configured to be placed against an interior of a rear wall of the oven when the burner tray is mounted within the cooking chamber of the oven, the front end of the oven and the rear wall of the oven are at opposite ends of the oven.

6. The cooking apparatus according to claim 1, wherein the burner tray is configured to receive the one or more of the combustible fuels through the fuel hatch lid when the fuel hatch lid has been removed.

7. The cooking apparatus according to claim 1, wherein the burner tray includes an aperture configured as a vent when the burner tray is mounted within the cooking chamber.

8. The cooking apparatus according to claim 1, wherein the cooking apparatus further comprises a door; and the door includes an open aperture.

9. The cooking apparatus according to claim 1, wherein the oven comprises legs such that the oven may be safely positioned on the ground during use.

10. The cooking apparatus according to claim 1, wherein the oven comprises a viewing port.

11. The cooking apparatus according to claim 1, wherein the oven comprises an external housing that is thermally insulated from the cooking chamber, such that one or more external portions of the oven may be safely handled in use.

12. The cooking apparatus according to claim 1, wherein the oven comprises a top surface, wherein an insulating air gap is provided between the top surface and the cooking chamber ceiling.

13. The cooking apparatus according to claim 1, wherein the cooking surface does not include any through holes.

14. The cooking apparatus according to claim 1, wherein the second burner unit is the burner tray and wherein when the burner tray is mounted within the cooking chamber the burner tray may be accessed directly by removing the fuel hatch lid, wherein the burner tray is configured to receive the one or more of the following combustible fuels through the fuel hatch after removal of the fuel hatch lid from the upper wall of the oven: wood chips, wood pellets, coal, split wood, twigs.

15. The cooking apparatus according to claim 1, wherein the fuel hatch lid comprises a handle.

16. The cooking apparatus according to claim 1, wherein the food receiving opening is larger than the rear interior wall.

17. The cooking apparatus according to claim 1, wherein the oven comprises at least one lower vent and at least one upper vent, the at least one lower vent being provided at a lower vertical height than the at least one upper vent, wherein the at least one upper vent comprises a flow regulator adjustable between two or more flow regulation configurations to thereby regulate a flow of heated air therethrough.

18. The cooking apparatus according to claim 1, wherein the cooking surface is of a quadrilateral shape.

19. The cooking apparatus according to claim 1, wherein the cooking chamber has a tapered profile such that the food receiving opening is larger than the rear interior wall.

* * * * *